(12) United States Patent
Wright et al.

(10) Patent No.: US 10,807,708 B2
(45) Date of Patent: Oct. 20, 2020

(54) AIR VEHICLE AND IMAGING APPARATUS THEREFOR

(71) Applicant: BAE Systems plc, London (GB)

(72) Inventors: Julian David Wright, Preston (GB); Nicholas Giacomo Robert Colosimo, Preston (GB); Clyde Warsop, Bristol (GB)

(73) Assignee: BAE Systems plc, London (GB)

( * ) Notice: Subject to any disclaimer, the term of this patent is extended or adjusted under 35 U.S.C. 154(b) by 193 days.

(21) Appl. No.: 15/768,729

(22) PCT Filed: Oct. 28, 2016

(86) PCT No.: PCT/GB2016/053346
§ 371 (c)(1),
(2) Date: Apr. 16, 2018

(87) PCT Pub. No.: WO2017/072518
PCT Pub. Date: May 4, 2017

(65) Prior Publication Data
US 2018/0305009 A1    Oct. 25, 2018

(30) Foreign Application Priority Data

Oct. 30, 2015  (EP) ..................................... 15275226
Oct. 30, 2015  (GB) ................................... 1519183.6

(51) Int. Cl.
*B64C 37/00* (2006.01)
*B64C 29/02* (2006.01)
(Continued)

(52) U.S. Cl.
CPC .............. *B64C 37/00* (2013.01); *B64C 29/02* (2013.01); *B64C 39/02* (2013.01); *B64C 39/024* (2013.01);
(Continued)

(58) Field of Classification Search
CPC ........ B64C 2201/088; B64C 2201/102; B64C 2201/123; B64C 2201/127
See application file for complete search history.

(56) References Cited

U.S. PATENT DOCUMENTS 1,790,309 A   1/1931 Keintz
2,349,858 A   5/1944 Gillmor
(Continued)

FOREIGN PATENT DOCUMENTS

CN    104787315 A    7/2015
CN    204822073 U   12/2015
(Continued)

OTHER PUBLICATIONS

International Preliminary Report on Patentability of International Application No. PCTGB2016053346, dated May 11, 2018, 11 pages.

(Continued)

*Primary Examiner* — Philip J Bonzell
*Assistant Examiner* — Tye William Abell
(74) *Attorney, Agent, or Firm* — Maine Cernota & Rardin

(57) ABSTRACT

An air vehicle (10) comprising a main body (12) and a pair of opposing wing members (14a, 14b) extending substantially laterally from the main body (12) having a principal axis orthogonal to the longitudinal axis (20) of said wing members, at least a first propulsion device (16a) associated with a first of said wing members arranged and configured to generate a linear thrust relative to the main body in a first direction, and a second propulsion device (16b) associated with a second of said wing members arranged and configured to generate linear thrust relative to said main body in a second, substantially opposite, direction such that said wing members and said main body are caused to rotate about said principal axis, in use, the air vehicle further comprising an
(Continued)

imaging system (100) configured to cover a substantially 360° imaging area about said principal axis and comprising at least one electro-optic sensor (102) mounted on a support member (104) and having a field of view (102a) covering a portion of said imaging area, said support member being mounted on said air vehicle, said imaging system (100) further comprising a control module (400) configured to define an object or region of interest in relation to said air vehicle, determine a nominal sensor field of view incorporating said object or region of interest, and obtain sequential image data from a sensor having a field of view matching said nominal field of view as said air vehicle completes a rotary cycle.

19 Claims, 5 Drawing Sheets

(51) Int. Cl.
  *B64C 39/02* (2006.01)
  *H04N 5/232* (2006.01)
  *H04N 5/225* (2006.01)

(52) U.S. Cl.
  CPC ....... *H04N 5/2257* (2013.01); *H04N 5/23238* (2013.01); *B64C 2201/088* (2013.01); *B64C 2201/123* (2013.01); *B64C 2201/127* (2013.01)

(56) References Cited

U.S. PATENT DOCUMENTS

| | | | |
|---|---|---|---|
| 2,479,125 A | 8/1949 | Leonard | |
| 3,136,501 A | 6/1964 | Barber | |
| 4,123,020 A | 10/1978 | Korsak | |
| 4,522,104 A | 6/1985 | Degen | |
| 5,267,885 A | 12/1993 | Niskern | |
| 5,279,199 A | 1/1994 | August | |
| 5,765,783 A | 6/1998 | Albion | |
| 6,260,796 B1 | 7/2001 | Klingensmith | |
| 6,477,326 B1 | 11/2002 | Partynski | |
| 8,544,788 B1* | 10/2013 | Capper | B64B 1/28 244/30 |
| 9,085,354 B1* | 7/2015 | Peeters | B64C 29/02 |
| 2003/0179288 A1* | 9/2003 | Jones | F41H 11/00 348/43 |
| 2003/0185549 A1* | 10/2003 | Partynski | G02B 17/0808 396/7 |
| 2008/0105112 A1 | 5/2008 | Grabmeier | |
| 2008/0223994 A1 | 9/2008 | Greenley | |
| 2010/0025543 A1 | 2/2010 | Kinsey et al. | |
| 2010/0228406 A1* | 9/2010 | Hamke | G05D 1/0094 701/3 |
| 2010/0252690 A1 | 10/2010 | Hothi | |
| 2012/0248259 A1 | 10/2012 | Page et al. | |
| 2013/0162761 A1* | 6/2013 | Goldemann | H04N 5/23238 348/36 |
| 2013/0250047 A1* | 9/2013 | Hollinger | H04N 7/183 348/36 |
| 2014/0008498 A1* | 1/2014 | Reiter | B64C 29/00 244/7 A |
| 2014/0340427 A1* | 11/2014 | Baker | H04N 9/3185 345/641 |
| 2018/0370624 A1 | 12/2018 | Seale | |

FOREIGN PATENT DOCUMENTS

| | | |
|---|---|---|
| DE | 1269497 B | 5/1968 |
| DE | 102006021182 A1 | 11/2007 |
| DE | 102007054126 A1 | 5/2009 |
| EP | 1873058 A2 | 1/2008 |
| FR | 757191 A | 12/1933 |
| FR | 2246444 A1 | 5/1975 |
| FR | 2379430 A2 | 9/1978 |
| FR | 2796454 A1 | 1/2001 |
| GB | 272455 A | 12/1927 |
| GB | 2514582 A | 12/2014 |
| JP | H03292294 A | 12/1991 |
| JP | 2012111475 A | 6/2012 |
| RU | 2072942 C1 | 2/1997 |
| RU | 2330790 C2 | 8/2008 |
| WO | 03063513 A1 | 7/2003 |
| WO | 2008112686 A1 | 9/2008 |
| WO | 2009059173 A1 | 5/2009 |
| WO | 2012029063 A1 | 3/2012 |
| WO | 2012035153 A1 | 3/2012 |
| WO | 2013109742 A1 | 7/2013 |
| WO | 2013120912 A1 | 8/2013 |
| WO | 2014118299 A1 | 8/2014 |
| WO | 2014177591 A1 | 11/2014 |
| WO | 2016109408 A | 7/2016 |
| WO | 2017007915 A1 | 1/2017 |

OTHER PUBLICATIONS

International Preliminary Report on Patentability of International Application No. PCTGB2016053347, dated May 11, 2018, 9 pages.
International Preliminary Report on Patentability of International Application No. PCTGB2016053348, dated May 11, 2018, 11 pages.
International Preliminary Report on Patentability of International Application No. PCTGB2016053345, dated May 11, 2018, 8 pages.
International Preliminary Report on Patentability of International Application No. PCTGB2016053353, dated May 11, 2018, 8 pages.
International Search Report and Written Opinion of International Application No. PCT/GB2016/053347, dated Jan. 18, 2017, 13 pages.
Search Report under Section 17(5) of Great Britain Application No. GB1519180.2, dated Apr. 27, 2016, 3 pages.
Combined Search and Examination Report under Sections 17 and 18(3) of Great Britain Application No. GB1618228.9, dated Mar. 29, 2017, 7 pages.
Extended European Search Report of European Application No. EP15275224, dated Mar. 24, 2016, 8 pages.
International Search Report and Written Opinion of International Application No. PCT/GB2016/053348, dated Jan. 19, 2017, 18 pages.
Search Report under Section 17(5) of Great Britain Application No. GB1519178.6, dated Apr. 25, 2016, 3 pages.
Combined Search and Examination Report under Sections 17 and 18(3) of Great Britain Application No. GB1618236.2, dated Mar. 30, 2017, 6 pages.
Extended European Search Report of European Application No. EP15275223.4, dated Jun. 6, 2016, 12 pages.
International Search Report and Written Opinion of International Application No. PCT/GB202016053345, dated Jan. 11, 2017, 12 pages.
Search Report under Section 17(5) of Great Britain Application No. GB1519177.8, dated Apr. 25, 2016, 4 pages.
Extended European Search Report of European Application No. EP15275222.6, dated Apr. 27, 2016, 8 pages.
International Search Report and Written Opinion of International Application No. PCT/GB2016/053346, dated Jan. 9, 2017, 15 pages.
Search Report under Section 17(5) of Great Britain Application No. GB1519183.6, dated Apr. 29, 2016, 3 pages.
Combined Search and Examination Report under Sections 17 and 18(3) of Great Britain Application No. GB1618221.4, dated Mar. 23, 2017, 5 pages.
[Squadrone Systems] Hexo+ aerial drone system Kickstarter page, explaining key features, stored bu internet archive on Jul. 26, 2014. Found at http://web.archive.org/web/20140726061306/https://www.kickstarter.com/projects/sqdr/hexo-your-autonomous-aerial-camera Accessed Mar. 3, 2017.
Extended European Search Report of European Application No. EP15275226.7, dated Jul. 4, 2016, 12 pages.

(56) References Cited

OTHER PUBLICATIONS

International Search Report and Written Opinion of International Application No. PCT/GB2016/053353, dated Dec. 15, 2016, 11 pages.
Search Report under Section 17(5) of Great Britain Application No. GB1519181.0, dated Apr. 28, 2016, 3 pages.
Extended European Search Report of European Application No. EP15275225.9.
Notice of Allowance for U.S. Appl. No. 15/768,716, dated Aug. 3, 2020, 18 Pages.

\* cited by examiner

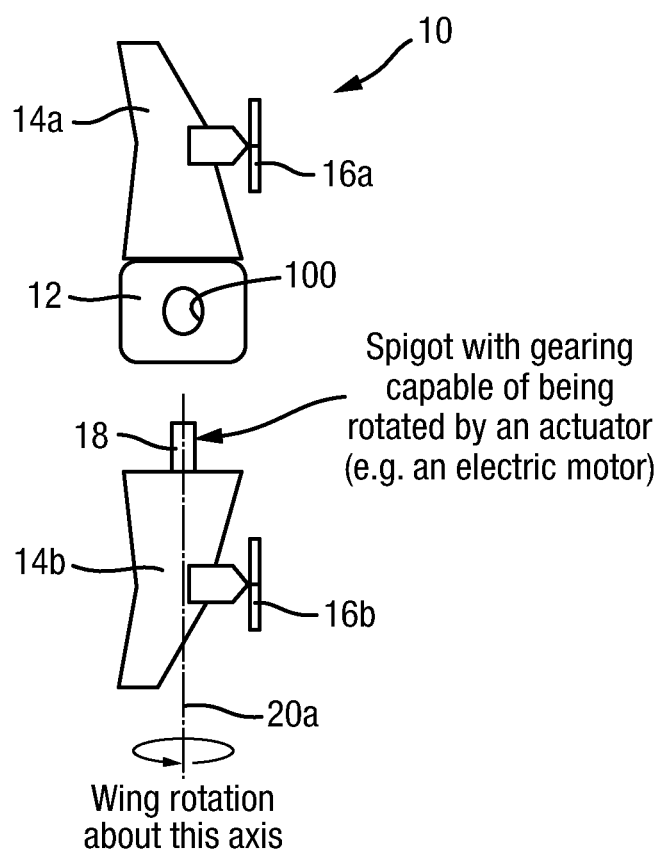

AIR VEHICLE AND IMAGING APPARATUS THEREFOR

RELATED APPLICATIONS

This application is a national phase application filed under 35 USC § 371 of PCT Application No. PCT/GB2016/053346 with an International filing date of Oct. 28, 2016 which claims priority of GB Patent Application 1519183.6 filed Oct. 30, 2015 and EP Patent Application 15275226.7 filed Oct. 30, 2015. Each of these applications is herein incorporated by reference in its entirety for all purposes.

This invention relates generally to an air vehicle and imaging apparatus therefor and, more particularly but not necessarily exclusively, to an unmanned aerial vehicle (UAV) and an imaging apparatus for use thereon.

Unmanned aerial vehicles (UAVs), or drones, are well known and used in many different military, as well as civil and commercial, applications, such as search and rescue surveillance, reconnaissance, etc. In general, a UAV is a powered aerial vehicle that does not require a human operator, uses aerodynamic forces to provide vehicle lift, and can fly autonomously or be piloted remotely. Although not always a requirement, it is often required for such vehicles to be recoverable and even reusable after a mission.

As with piloted air vehicles, two principal, general types of UAV are known: (i) fixed wing, and (ii) rotary wing.

A fixed wing air vehicle is illustrated schematically in FIG. 1A of the drawings. As shown, a fixed wing air vehicle comprises a main body 1 having a pair of wings 2 extending therefrom, and a respective thrust mechanism 3, such as a propeller or jet, mounted on (or in relation to) each wing. Lift is created by the vehicle's forward airspeed and the shape of the wings 2. The principal advantage of a fixed wing UAV is the speed and endurance that can be achieved, making such UAVs particularly suitable for long-distance and/or persistent missions.

A rotary wing air vehicle is illustrated schematically in FIG. 1B of the drawings. As shown, a rotary wing UAV typically comprises a main body 4 having a generally central mast 5 mounted at its upper end, with rotor blades 6 rotatably mounted on the mast 5. Lift is generated by high speed rotation of the rotor blades 6 around the mast 5. The principal advantage of a rotary wing UAV is that it can take off and land vertically as well as fly forwards, backwards and laterally, and hover, making it particularly suitable for take off and landing where ground space is limited, as well as specific surveillance operations where control is paramount. However, compared with fixed wing air vehicles, rotary winged aircraft have a relatively limited 'endurance'.

In many UAVs and similar air vehicles, a sensor system is mounted in or on the vehicle for use in image capture, surveillance etc. The specific type of sensor system employed is dependent on the type of air vehicle, but in general such a system will comprise a one or more electro-optical sensors mounted on a gimbal or similar support member provided on the air vehicle.

However, aspects of the present invention pose a unique problem, whereby the air vehicle itself may be rotating, in which case it becomes necessary to provide an imaging system whereby such rotation can be compensated for in order to obtain sequential image data from a single specified field of view as the vehicle completes a 360° rotary cycle. Prior art arrangements exist whereby a camera provided on a rotating entity or host captures multiple images during each rotation, and a processing module is used to select the images captured in the direction of a specified field of view of then 'paste' them together to create sequential image data in respect of that specified field of view. However, this technique introduces a very high processing overhead and, in some cases, may introduce an unacceptable delay between capturing the images and processing them to provide the required sequential image data relating only to a specified field of view.

Aspects of the present invention seek to address at least some of these issues and, in accordance with a first aspect of the present invention, there is provide an air vehicle comprising a main body and a pair of opposing wing members extending substantially laterally from the main body having a principal axis orthogonal to the longitudinal axis of said wing members, at least a first propulsion device associated with a first of said wing members arranged and configured to generate a linear thrust relative to the main body in a first direction, and a second propulsion device associated with a second of said wing members arranged and configured to generate linear thrust relative to said main body in a second, substantially opposite, direction such that said wing members and said main body are caused to rotate about said principal axis, in use, the air vehicle further comprising an imaging system configured to cover a substantially 360° imaging area about said principal axis and comprising at least one electro-optic sensor mounted on a support member and having a field of view covering a portion of said imaging area, said support member being mounted on said air vehicle, said imaging system further comprising a control module configured to define an object or region of interest in relation to said air vehicle, determine a nominal sensor field of view incorporating said object or region of interest, and obtain sequential image data only from a sensor having a field of view matching said nominal field of view as said air vehicle completes a rotary cycle.

Thus, in contrast to the prior art, the present invention is configured to first specify a field of view of interest and then cause only images from a sensor having that field of view to be obtained, thereby ensuring that sequential image data is captured in respect of that field of view in real time, and without requiring a massive processing (and memory) overhead to accommodate multiple unnecessary images.

In general, this is achieved by the control module being configured to determine the angle of rotation of the support member that results in a sensor having the nominal sensor field of view, and then obtaining an image (only) from that sensor every time the support member is determined to be at the above-mentioned angle of rotation.

In a first exemplary implementation of the present invention, the support member may be rotatably mounted on said air vehicle and configured to rotate, in use, at substantially the same speed as, and in the opposite direction to, said air vehicle about said principal axis.

The control module may be configured to determine a direction and speed of rotation of said air vehicle, and generate a control signal configured to cause said support member to rotate in a direction opposite thereto and at substantially the same speed.

In an alternative, second exemplary implementation of the present invention, the imaging system may comprise a plurality of electro-optic sensors mounted around a ring-like support member, said support member being fixedly mounted on said air vehicle and said electro-optic sensors being arranged thereon such that, together, their respective fields of view cover said substantially 360° imaging area, wherein said control module is configured to obtain said sequential image data from each of said electro-optic sensors in turn when the respective fields of view thereof match said nominal field of view as said air vehicle completes a rotary cycle.

In this case, the control module may be configured determine a first electro-optic sensor having a field of view matching said nominal field of view and obtain image data therefrom, and subsequently access each of said electro-optic sensors in turn, to obtain respective image data, in a direction opposite to the direction of rotation of said air vehicle and at a speed matching said speed of rotation of said air vehicle, such that the sequential image data thus obtained corresponds to said nominal field of view throughout a rotary cycle of said air vehicle.

The support member may be mounted to said main body via a rotatable shaft. The support member may be substantially circular and have a plurality of substantially equi-angularly spaced apart electro-optic sensors mounted at a peripheral edge thereof. Each of said electro-optic sensors may have a field of view such that it meets or overlaps the fields of view of adjacent electro-optic sensors.

In an exemplary embodiment of the invention, the propulsion devices may be fixedly coupled to respective wing members, and at least one of said wing members is rotatably mounted with respect to said body for rotation about an axis orthogonal to the width of the main body when in an upright orientation, between a first position defining a rotary wing flying mode wherein thrust generated by said propulsion devices acts in opposite respective directions relative to said main body, and a second position defining said fixed flying mode wherein thrust generated by both said propulsion devices acts in the same direction relative to the main body. In this case, the at least one wing member may be configured to rotate through substantially 180° about said axis between said first and second positions. The at least one wing member may be mounted to the main body via a coupling member, said coupling member engaging with an actuation device located in or on said main body, wherein operation of said actuation member is effected by said control signal and causes rotation of said at least one wing member via said coupling member.

In accordance with another aspect of the present invention, there is provided an imaging system for an air vehicle substantially as described above, said imaging system comprising a support member having at least one electro-optic sensor provided thereon, said support member comprising means for mounting said imaging system to said main body of said air vehicle, said imaging system further comprising a control module for compensating for rotary movement of said main body by defining an object or region of interest in relation to said air vehicle, determining a nominal sensor field of view incorporating said object or region of interest, and obtaining sequential image data from a sensor having a field of view matching said nominal field of view as said air vehicle completes a rotary cycle.

In an exemplary embodiment, the support member may comprise a ring-like structure on which are mounted a plurality of equi-angularly spaced electro-optic sensors such that their respective fields of view, together, cover a substantially 360° imaging area in relation to said air vehicle, and said control module is configured to obtain said sequential image data by obtaining image data from each of said sensors in turn when the respective fields of view thereof match said nominal field of view as said air vehicle completes a rotary cycle.

In an alternative exemplary embodiment, the support member may be rotatably mountable to said air vehicle, and configured to rotate, in use, at substantially the same speed as, and in the opposite direction to, said air vehicle about said principal axis.

In accordance with yet another aspect of the present invention, there is provided a method of imaging from an air vehicle substantially as described above, comprising mounting an imaging system substantially as described above on said main body in line with said principal axis, and causing said control module to obtain sequential image data from a sensor having a field of view matching said nominal field of view as said air vehicle completes a rotary cycle.

These and other aspects of the invention will be apparent from the following specific description in which embodiments of the invention are described, by way of examples only and with reference to the accompanying drawings, in which:

FIG. 3A is a schematic side cross-sectional view of a wing for use in a hybrid fixed-rotary wing air vehicle according to an exemplary embodiment of the present invention;

FIG. 4 is a schematic plan view illustrating the manner of connection of a wing to the main body in a hybrid fixed-rotary wing air vehicle according to an exemplary embodiment of the present invention;

Figure 1A:
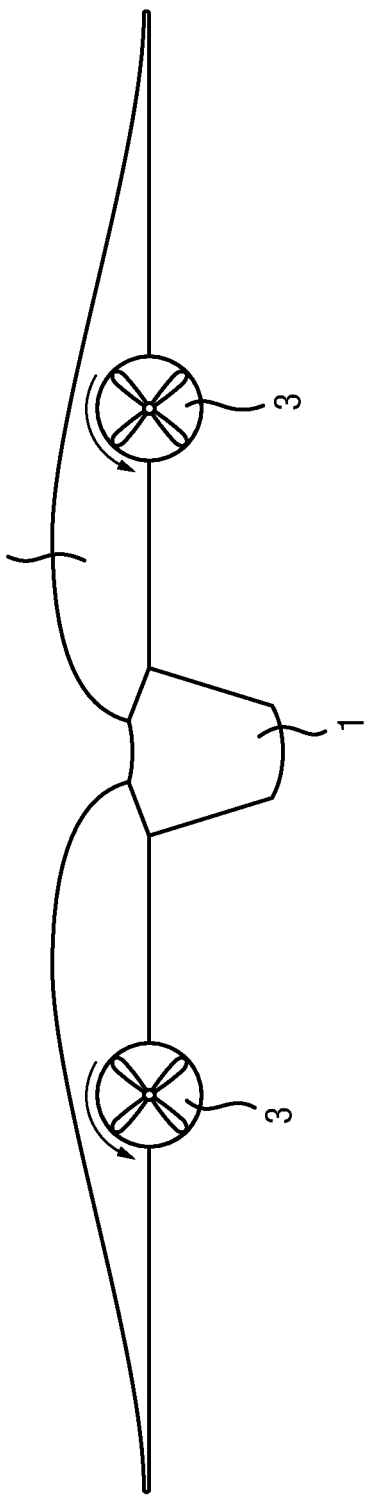
FIG. 1A is a schematic front view of a fixed wing air vehicle according to the prior art.
Figure 1B:
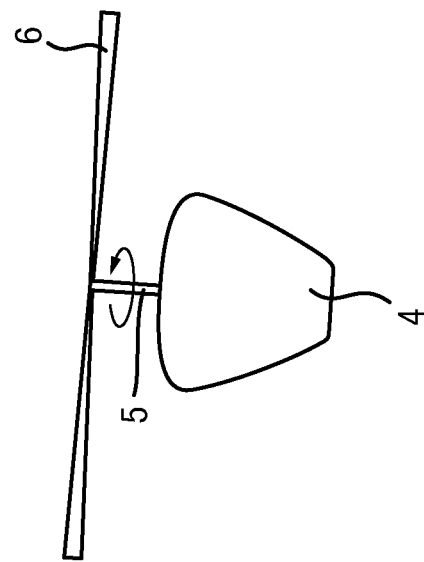
FIG. 1B is a schematic front view of a rotary wing air vehicle according to the prior art.
Figure 3:
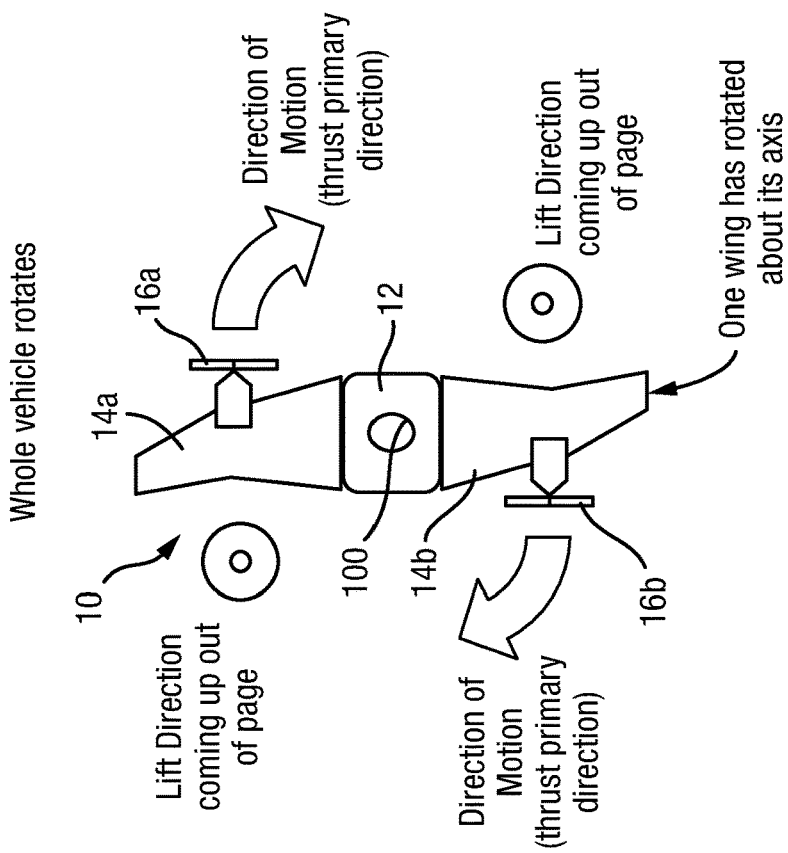
FIG. 3 is a schematic plan view of the hybrid fixed-rotary wing air vehicle of FIG. 2, illustrated in the rotary wing flying mode configuration.
Figure 2:
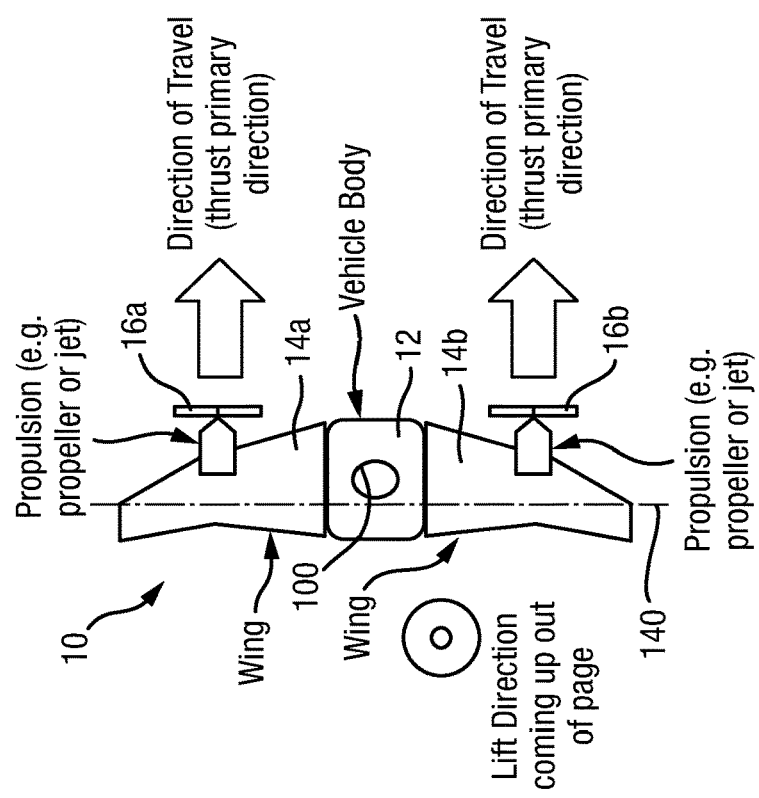
FIG. 2 is a schematic plan view of a hybrid fixed-rotary wing air vehicle according to a first exemplary embodiment of the present invention, illustrated in the fixed wing flying mode configuration.

Referring to FIG. 2 of the drawings, an air vehicle 10 according to a first exemplary embodiment of the present invention comprises a main body 12, on which are mounted two opposing wing members 14a, 14b such that they extend laterally outward from respective opposing sides of the main body 12. In the example shown, the wings 14a, 14b have a compound swept back configuration, to aid aerodynamic stability and reduce drag, but it will be appreciated that the present invention is in no way intended to be limited with regard to wing configuration. A respective propulsion device 16a, 16b is mounted at the 'leading' edge of each wing 14a, 14b and, in the example shown, the propulsion devices 16a, 16b are facing in the same direction. Thus, when both propulsion devices are operated to generate thrust in the same direction, they cause the vehicle to move forwards. Referring additionally to FIG. 3A of the drawings, the aerofoil cross-sectional shape of the wings 14a, 14b produces an aerodynamic force as the vehicle moves forward; and the component of this force perpendicular to the direction of motion is called lift, whereas the component parallel to the direction of motion is called drag. "Turning" of the air in the vicinity of the aerofoil creates curved streamlines, resulting in lower pressure on one side and higher pressure on the other. This pressure difference is accompanied by a velocity difference, via Bernoulli's principle, so the resulting flowfield about the aerofoil has a higher average velocity on the upper surface than on the lower surface. The lift force is related directly to the average top/bottom velocity difference.

Referring back to FIG. 2 and also to FIG. 4 of the drawings, at least one of the wings 14*b* is rotatably mounted on the side of the main body 12 by means of a longitudinal shaft 18 extending from the inner end of the wing 14*b*. Thus, referring to FIG. 3 of the drawings, in the event that it is required to change the mode of flying of the vehicle 10 from fixed wing to rotary wing flying mode, a control signal is generated that causes the wing 14*b* to rotate about the axis 20 defined by the shaft 18, such that the leading edge of the wing 14*b* and the associated propulsion device 16*b* are facing in the opposite direction. With the thrust from the two propulsion devices 16*a*, 16*b* now operating in opposite linear directions, the net result is a rotary force that causes the air vehicle 10 as a whole to spin. Lift is maintained because the spinning wings act a rotary blade forcing air downwardly to overcome the force of gravity and create vertical lift. However, it is envisaged that the effective aerofoil cross-section of the propeller blades may be dynamically altered according to their relative location within a rotary cycle in order to maintain efficient horizontal movement of the vehicle. In the rotary wing mode, the aircraft can be controlled in a manner similar to a conventional rotary wing air vehicle, to control vertical, horizontal and rotational movement of the vehicle, as required.

Figure 4A:
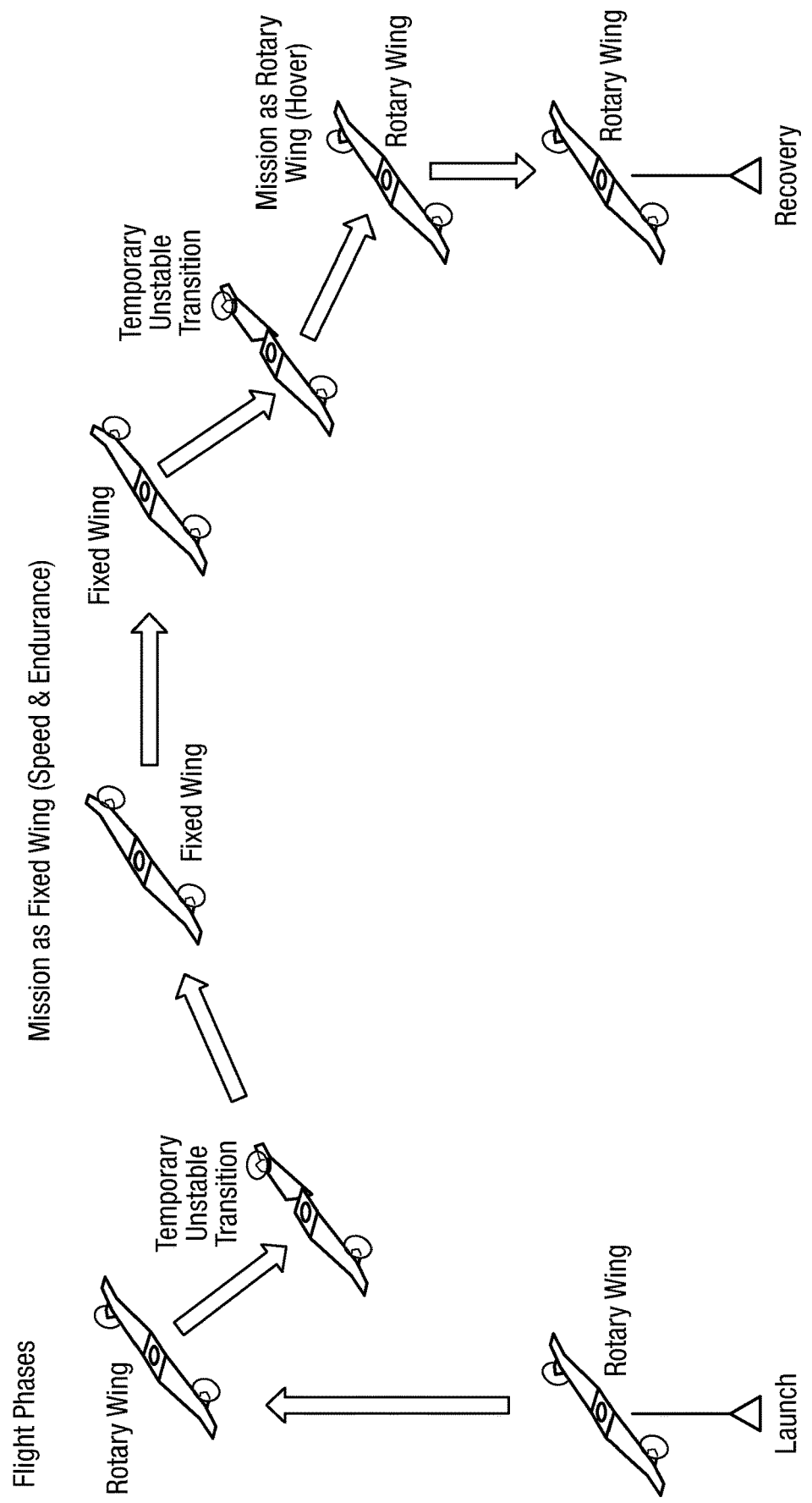
FIG. 4A is a schematic diagram illustrating the flight phases of a typical mission undertaken by a hybrid fixed-rotary wing air vehicle according to an exemplary embodiment of the present invention.

Thus, referring to FIG. 4A of the drawings, the present invention provides an air vehicle concept which is capable of hovering flight, taking off and landing vertically within landing zones similar to, or smaller than, those associated with typical rotary wing aircraft, but has the ability to transition to fixed wing flight, thereby achieving the increased speed and endurance characteristics associated therewith.

During rotary wing flight, the whole vehicle is rotating rapidly. However, it will be apparent to a person skilled in the art that, since the main body 12 of the air vehicle 10 spins with the wing members 14*a*, 14*b* when the air vehicle is in the rotary-wing flying mode, any sensor assembly affixed thereto will also spin. In the case of a sensor assembly comprising a plurality of electro-optic sensors (used for image capture, surveillance etc., as required during 'hover' mode), the pointing direction thereof will be constantly changing at a high speed, resulting in blurring of images and/or the wrong location(s) being imaged. Thus, in accordance with a first exemplary embodiment of the present invention, a sensor assembly comprising a rotatable mount and at least one sensor may be provided on the main body of the air vehicle, and configured to rotate at the same speed as, but in the opposite direction to, the main body, with the net effect that the pointing direction of the sensor(s) remains substantially the same as the vehicle spins, and can thus be controlled as required.

Figure 5:
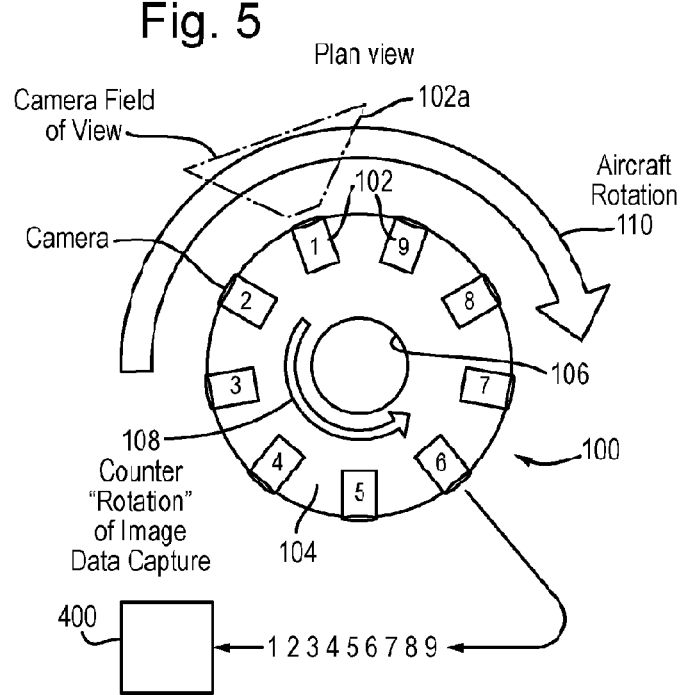
FIG. 5 is a schematic plan view of an imaging system according to an exemplary embodiment of the present invention.
Figure 6:
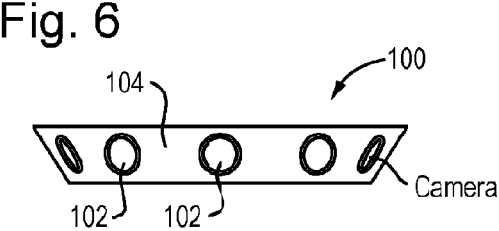
FIG. 6 is a schematic side view of the imaging system of FIG. 5.
Figure 7:
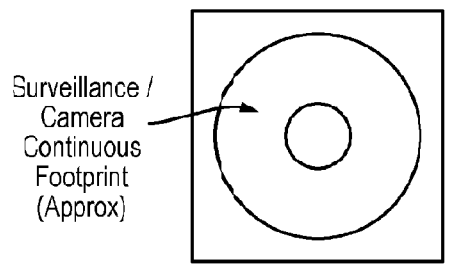
FIG. 7 is a schematic plan view of a surface under surveillance below an air vehicle using the imaging system of FIGS. 5 and 6.

Alternatively, and referring to FIGS. 5 and 6 of the drawings, in a second exemplary embodiment of the present invention, a sensor assembly 100 comprises a plurality of electro-optic sensors 102, having a respective field of view 102*a*, arranged in equi-angularly spaced arrangement around the periphery of a generally circular mount 104. The number of sensors 102 and their spacing around the mount 104 is such that their respective fields of view 102*a* overlap to form a continuous 360° footprint, as illustrated schematically in FIG. 7 of the drawings. The circular mount 104 has a central aperture 106, by which it can be mounted to a fixed mounting block (not shown) on the main body of the air vehicle, and located to correspond with the axis of rotation of the air vehicle when in the rotary-wing flying mode. Thus, rotation of the air vehicle causes corresponding rotation of the circular mount 104 and, therefore, the sensors 102.

A control module 400 is configured to electronically compensate for such rotation of the sensors 102 by selecting images from the sensor determined to have a field of view covering the object or area of interest at any given point during a rotary cycle of the air vehicle. Thus, as the vehicle rotates, images are obtained from each of the sensors in turn in a sequence opposite in direction to the direction of rotation of the air vehicle and at a speed corresponding thereto, such that the images 1, 2, 3, 4, 5, 6, 7, 8, 9 thus obtained actually all cover the same field of view obtained at different respective times as the vehicle rotates, and are input to the control module sequentially, as shown.

It will be apparent to a person skilled in the art, from the foregoing description, that modifications and variations can be made to the described embodiments without departing from the scope of the invention as defined in the appended claims.

The invention claimed is:

1. An air vehicle comprising a main body and a pair of opposing wing members extending substantially laterally from the main body, wherein the wing members have a longitudinal axis and wherein the main body has a principal axis orthogonal to the longitudinal axis of said wing members, the air vehicle further comprising at least a first propulsion device associated with a first of said wing members arranged and configured to generate a linear thrust relative to the main body in a first direction, and a second propulsion device associated with a second of said wing members arranged and configured to generate linear thrust relative to said main body in a second, substantially opposite, direction such that said wing members and said main body are caused to rotate about said principal axis, in use, the air vehicle further comprising an imaging system configured to cover a substantially 360° imaging area about said principal axis and comprising at least one electro-optic sensor mounted on a support member and having a field of view covering a portion of said imaging area, said support member being mounted on said air vehicle, said imaging system further comprising a control module configured to define an object or region of interest in relation to said air vehicle, determine a nominal sensor field of view incorporating said object or region of interest, and obtain sequential image data only from a sensor having a field of view matching said nominal field of view as said air vehicle completes a rotary cycle.

2. The air vehicle according to claim 1, wherein said propulsion devices are fixedly coupled to respective wing members, and at least one of said wing members is rotatably mounted with respect to said main body for rotation about the longitudinal axis between a first position defining a rotary wing flying mode, wherein thrust generated by said propulsion devices acts in opposite respective directions relative to said main body, and a second position defining said fixed flying mode, wherein thrust generated by both said propulsion devices acts in the same direction relative to the main body.

3. The air vehicle according to claim 2, wherein the at least one wing member is mounted to the main body via a coupling member, said coupling member engaging with an actuation device located in or on said main body, wherein operation of said actuation device is effected by a control signal and causes rotation of said at least one wing member via said coupling member.

4. The air vehicle according to claim 1, wherein said support member is rotatably mounted on said air vehicle and configured to rotate, in use, at substantially the same speed as, and in the opposite direction to, said air vehicle about said principal axis, such that said object or region of interest is substantially maintained within the field of view of a single electro-optic sensor.

5. The air vehicle according to claim 4, wherein said support member is mounted to said main body via a rotatable shaft.

6. The air vehicle according to claim 4, wherein said control module is configured to determine a direction and speed of rotation of said air vehicle, and generate a control signal configured to cause said support member to rotate in a direction opposite thereto and at substantially the same speed.

7. The imaging system for an air vehicle according to claim 1, said imaging system comprising:
 a support member having at least one electro-optic sensor provided thereon, said support member fixedly mounting said imaging system to said main body of said air vehicle, said imaging system further comprising:
 a control module for compensating for rotary movement of said main body by defining an object or region of interest in relation to said air vehicle;
 determining a nominal sensor field of view incorporating said object or region of interest; and
 obtaining sequential image data only from a sensor having a field of view matching said nominal field of view as said air vehicle completes a rotary cycle.

8. The imaging system according to claim 7, wherein said support member is a ring-like structure on which are mounted a plurality of equi-angularly spaced electro-optic sensors such that their respective fields of view, together, cover a substantially 360° imaging area in relation to said air vehicle, and said control module is configured to obtain said sequential image data by obtaining image data from each of said sensors in turn when the respective fields of view thereof match said nominal field of view as said air vehicle completes a rotary cycle.

9. The imaging system according to claim 7, wherein said support member is rotatably mountable to said air vehicle, and configured to rotate, in use, at substantially the same speed as, and in the opposite direction to, said air vehicle about said principal axis.

10. The air vehicle according to claim 1, wherein said control module is configured to determine a relative or absolute rotational angle of said support member that results in a sensor thereon having said nominal field of view, and obtaining said sequential image data from said sensor only when said support member is at said rotational angle.

11. The air vehicle according to claim 10, wherein said support member is rotatably mounted on said air vehicle and configured to rotate, in use, at substantially the same speed as, and in the opposite direction to, said air vehicle about said principal axis, such that said object or region of interest is substantially maintained within the field of view of a single electro-optic sensor.

12. The air vehicle according to claim 10, wherein said imaging system comprises a plurality of electro-optic sensors mounted on a support member, said support member being fixedly mounted on said air vehicle and said electro-optic sensors being arranged thereon such that, together, their respective fields of view cover said substantially 360° imaging area, wherein said control module is configured to obtain said sequential image data from each of said electro-optic sensors in turn when the respective fields of view thereof match said nominal field of view as said air vehicle completes a rotary cycle.

13. The air vehicle according to claim 10, wherein said propulsion devices are fixedly coupled to respective wing members, and at least one of said wing members is rotatably mounted with respect to said body for rotation about the longitudinal axis between a first position defining a rotary wing flying mode, wherein thrust generated by said propulsion devices acts in opposite respective directions relative to said main body, and a second position defining said fixed flying mode, wherein thrust generated by both said propulsion devices acts in the same direction relative to the main body.

14. The air vehicle according to claim 10, wherein said imaging system comprising:
 a support member having at least one electro-optic sensor provided thereon, said support member fixedly mounting said imaging system to said main body of said air vehicle, said imaging system further comprising:
 a control module for compensating for rotary movement of said main body by defining an object or region of interest in relation to said air vehicle;
 determining a nominal sensor field of view incorporating said object or region of interest; and
 obtaining sequential image data only from a sensor having a field of view matching said nominal field of view as said air vehicle completes a rotary cycle.

15. The air vehicle according to claim 1, wherein said imaging system comprises a plurality of electro-optic sensors mounted on a support member, said support member being fixedly mounted on said air vehicle and said electro-optic sensors being arranged thereon such that, together, their respective fields of view cover said substantially 360° imaging area, wherein said control module is configured to obtain said sequential image data from each of said electro-optic sensors in turn when the respective fields of view thereof match said nominal field of view as said air vehicle completes a rotary cycle.

16. The air vehicle according to claim 15, wherein said control module is configured to determine a first electro-optic sensor having a field of view matching said nominal field of view and obtain image data therefrom, and subsequently access each of said electro-optic sensors in turn, and in a direction opposite to the direction of rotation of said air vehicle and at a speed matching said speed of rotation of said air vehicle, to obtain respective image data therefrom, such that the sequential image data thus obtained corresponds to said nominal field of view throughout a rotary cycle of said air vehicle.

17. The air vehicle according to claim 15, wherein said support member is substantially circular and has a plurality of substantially equi-angularly spaced apart electro-optic sensors mounted at a peripheral edge thereof.

18. The air vehicle according to claim 17, wherein each of said electro-optic sensors has a field of view such that it meets or overlaps the fields of view of adjacent electro-optic sensors.

19. A method of imaging from an air vehicle, the air vehicle comprising:
 a main body; and
 a pair of opposing wing members extending substantially laterally from the main body, wherein the wing members have a longitudinal axis and wherein the main body has a principal axis orthogonal to the longitudinal axis of said wing members, the air vehicle further comprising:

at least a first propulsion device associated with a first of said wing members arranged and configured to generate a linear thrust relative to the main body in a first direction; and a second propulsion device associated with a second of said wing members arranged and configured to generate linear thrust relative to said main body in a second, substantially opposite, direction such that said wing members and said main body are caused to rotate about said principal axis, in use, the air vehicle further comprising:

an imaging system configured to cover a substantially 360° imaging area about said principal axis and comprising:

at least one electrooptic sensor mounted on a support member and having a field of view covering a portion of said imaging area, said support member being mounted on said air vehicle, said imaging system further comprising:

a control module configured to define an object or region of interest in relation to said air vehicle;

determine a nominal sensor field of view incorporating said object or region of interest; and obtain sequential image data only from a sensor having a field of view matching said nominal field of view as said air vehicle completes a rotary cycle, the method comprising:

mounting an imaging system, the imaging system comprising:

a support member having at least one electro-optic sensor provided thereon, said support member fixedly mounting said imaging system to said main body of said air vehicle, said imaging system further comprising:

a control module for compensating for rotary movement of said main body by defining an object or region of interest in relation to said air vehicle;

determining a nominal sensor field of view incorporating said object or region of interest; and obtaining sequential image data only from a sensor having a field of view matching said nominal field of view as said air vehicle completes a rotary cycle, on said main body in line with said principal axis; and causing said control module to obtain sequential image data only from a sensor having a field of view matching said nominal field of view as said air vehicle completes a rotary cycle.

\* \* \* \* \*